United States Patent

Matsuura

[11] Patent Number: 5,188,498
[45] Date of Patent: Feb. 23, 1993

[54] CARGO DOCKING DEVICE

[75] Inventor: Takasi Matsuura, Tokyo, Japan

[73] Assignee: Matsura Kenkyusho Kabushiki Kaisha, Tokyo, Japan

[21] Appl. No.: 699,507

[22] Filed: May 2, 1991

[51] Int. Cl.$^5$ .............................................. E04H 6/22
[52] U.S. Cl. ..................................... 414/331; 414/239
[58] Field of Search ............... 414/233, 234, 236, 237, 414/239, 240, 241, 267, 281, 284, 331, 787

[56] References Cited

U.S. PATENT DOCUMENTS

| | | | |
|---|---|---|---|
| 3,933,257 | 1/1976 | Weber | 414/267 X |
| 4,568,233 | 2/1986 | Baker et al. | 414/267 |

FOREIGN PATENT DOCUMENTS

| | | | |
|---|---|---|---|
| 0085076 | 7/1978 | Japan | 414/234 |
| 0275863 | 11/1989 | Japan | 414/233 |
| 0278664 | 11/1989 | Japan | 414/233 |
| 2224017 | 4/1990 | United Kingdom | 414/239 |

*Primary Examiner*—Michael S. Huppert
*Assistant Examiner*—James T. Eller, Jr.
*Attorney, Agent, or Firm*—Browdy and Neimark

[57] ABSTRACT

A cargo docking device according to this device has a frame body with at least two rows in breadth, two rows in depth, and two stages in height, and multiple entrance sections arranged in the full length in the front side of the frame body. The device comprises a transfer frame arranged in the frame body and movable sideways, a first forklift hung via a wire from the frame body in a manner allowing free movement thereof in the vertical direction, having a pair of right and left forks and located above the transfer frame at a position on the upper stage, a second forklift having a pair of right and left forks hung via a wire from the aforesaid transfer frame in a manner allowing free movement thereof in the vertical direction, self-propelled trucks arranged on each of the entrance sections respectively and being capable of going into each longitudinal row. The first forklift is provided within each of multiple spaces formed by the lateral rows and longitudinal rows respectively. The transfer frames and the second forklifts provided within the multiple spaces, leaving one space for transfer in each lateral row. A lateral width of each of the trucks is narrower than a clearance between a pair of forks of the first and second forklifts.

1 Claim, 6 Drawing Sheets

CARGO DOCKING DEVICE

FIELD OF THE INVENTION

This invention relates to a cargo docking device with at least two rows in breadth, two rows in depth respectively and two stages in height, and particularly to a cargo docking device suited to non-self-propelled cargos such as packed cargos.

BACKGROUND OF THE INVENTION

Cargo docking devices such as docking rooms with at least two rows in breadth, two rows in depth respectively and two stages in height for self-propelled heavy cargos such as vehicles to park therein are well known.

Objects to be docked in said well-known docking rooms are self-propelled cargos such as cars, and it was virtually impossible to use such devices for docking non-self-propelled cargos such as packed ones.

SUMMARY OF THE INVENTION

A purpose of the present invention is to provide a cargo docking device wherein non-self-propelled cargos such as packed cargos can easily be docked.

EMBODIMENTS

Figure 1:
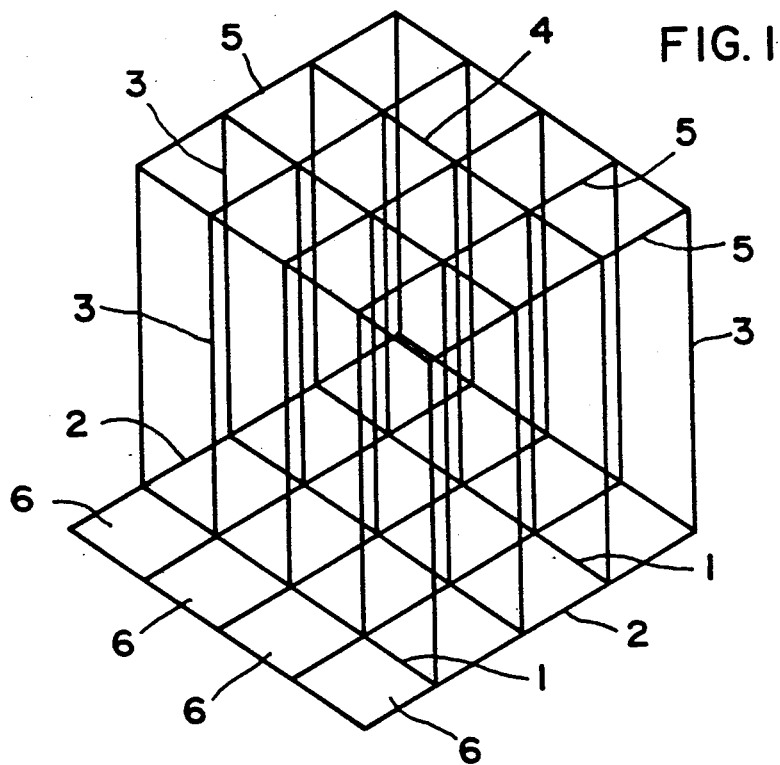
FIG. 1 is a perspective view of a frame body of the cargo decking device.
Figure 2:
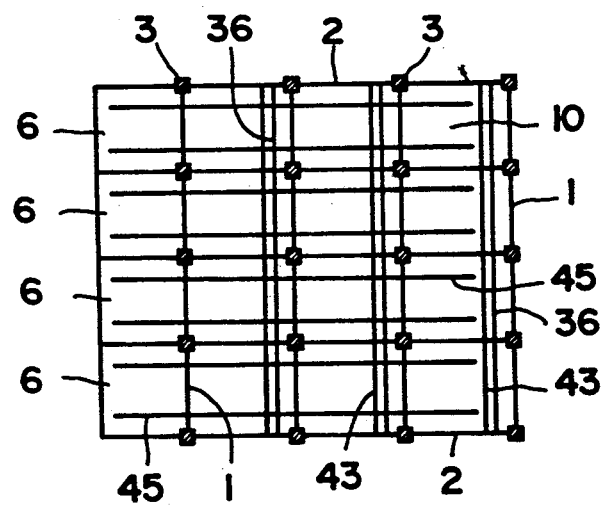
FIG. 2 is a cross-sectional top view showing relations between a frame body of the cargo docking system and the rails.
Figure 3:
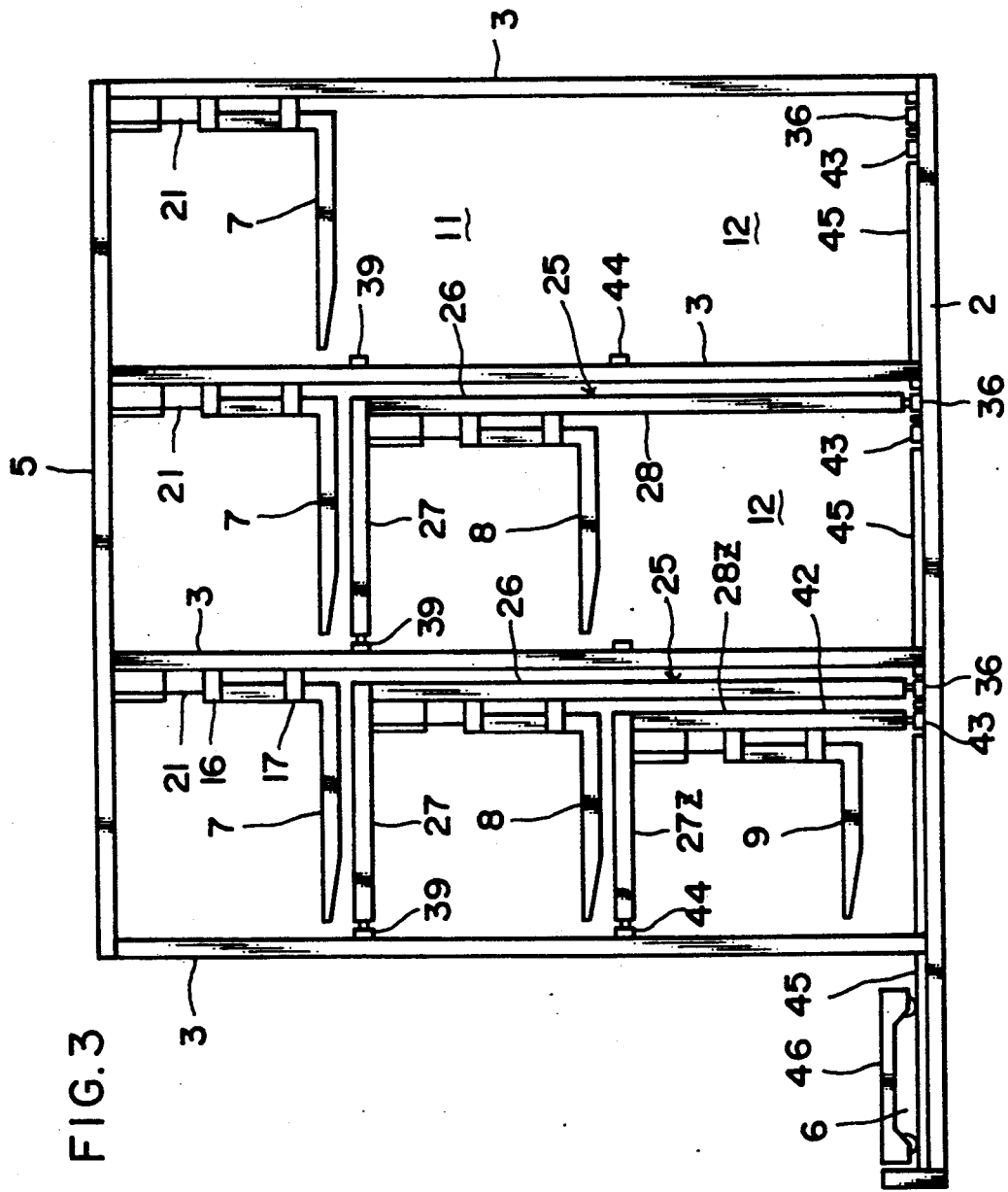
FIG. 3 is a side schematic view of the entire device.

Description is made hereunder for an embodiment of this invention with reference to several drawings thereof. FIG. 1 shows, as an example, outline of a frame body of a docking device with three rows in breadth, four rows in depth, and three stages in height. Said frame body comprises base lateral frames 1 and base longitudinal frames 2, both of which are placed on a floor, vertical columns 3 extending upward from each of the intersections between the base lateral frames 1 and the base longitudinal frames 2, ceiling lateral frames 4 and ceiling longitudinal frames 5, both of which are fixed at an upper end of each of the vertical columns 3.

The base longitudinal frames 2 are formed with an additional length equivalent to one lateral row in the front side to form multiple entrances 6 for cargoes loaded on and off.

In the aforesaid are arranged three types of lifts; upper stage forklifts 7, middle stage forklifts 8, and lower stage forklifts 9. Construction of each lift is the same, excluding their size.

Figure 4:
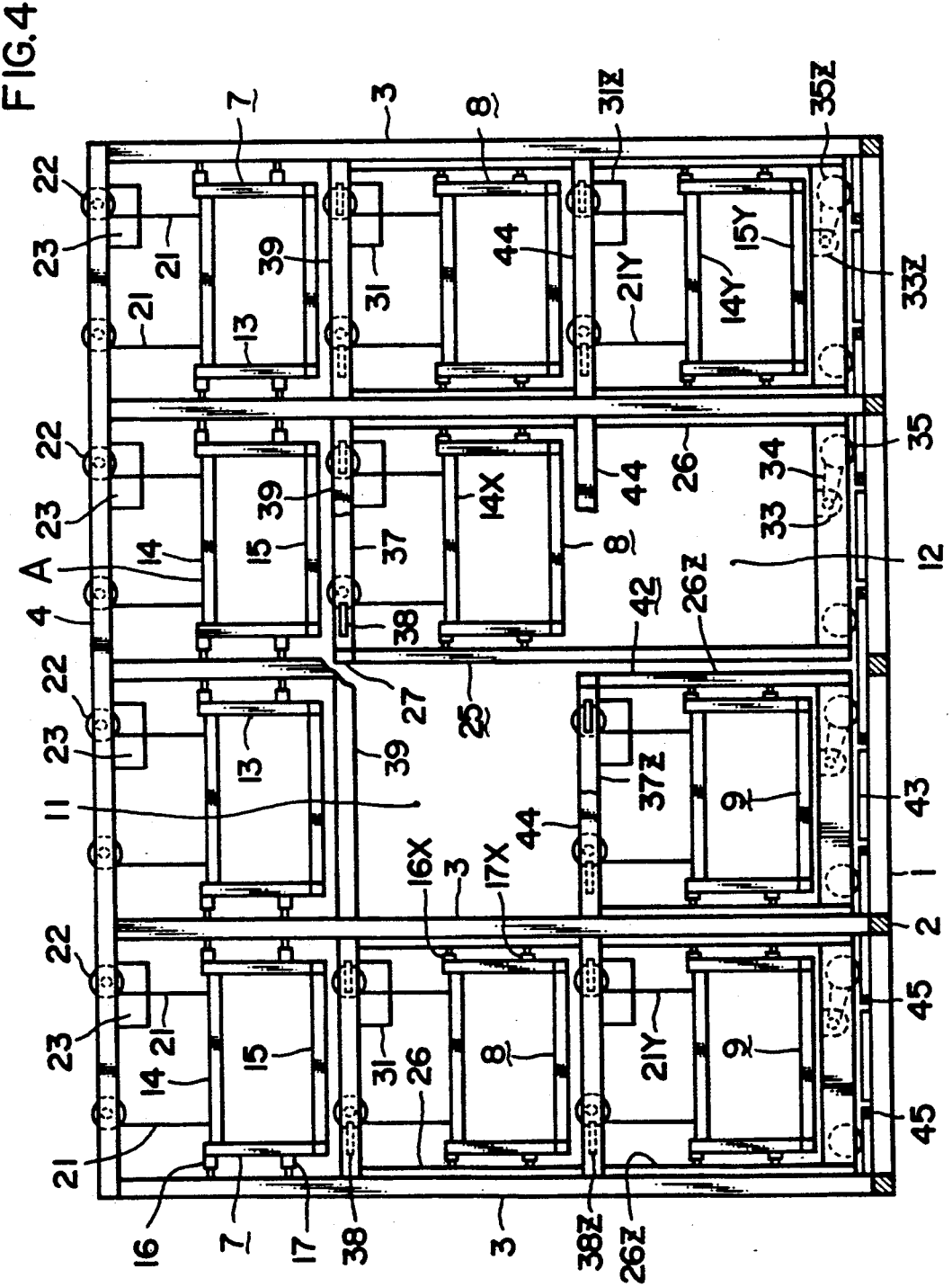
FIG. 4 is a front schematic view of the entire device.

Each of the forklifts 7 is arranged in each of twelve spaces 10 enclosed by four vertical columns 3 respectively. Three units of the middle stage forklifts 8 and three units of lower stage forklift 9 are arranged in each lateral row respectively, which means that the total number is nine units respectively of the middle stage forklifts 8 and the lower stage forklift 9. For this reason, as shown in FIG. 4, one middle stage transfer space 11 and one lower stage transfer space 12 are arranged in each lateral row.

Figure 6:
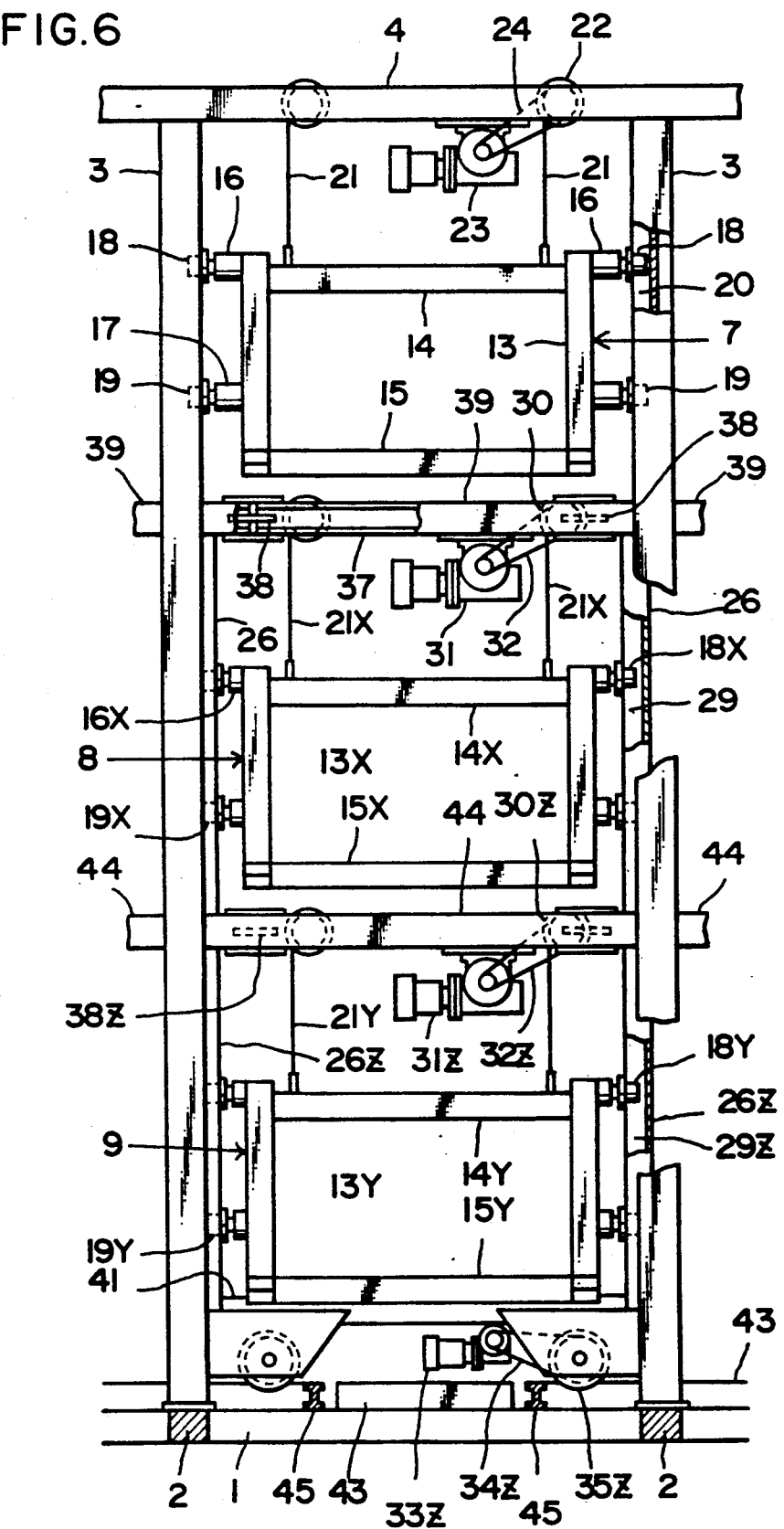
FIG. 6 is an enlarged front view lacking a portion of the device.

Each of the upper stage forklift 7 has a pair of L-shaped forks 13 which are arranged at an interval and coupled with an upper connecting bar 14 and a lower connecting bar 15. An upper bracket 16 and a lower bracket 17 thrusting backward are fixed to the fork 13, and an upper wheel 18 and a lower wheel 19 are attached to the upper bracket 16 and the lower bracket 17 respectively each in a rotating manner. The wheels 18 and 19 are engaged with a guide groove 20 formed on the vertical column 3 (FIG. 6).

Lower ends of a pair of wires 21 are attached to the upper connecting bar 14, while upper ends of the wires 21 are attached to a drum 22 mounted on the ceiling lateral frame 4. The rolling drum 22 is connected to a motor 23 with a chain 24, and when the rolling drum 22 is rotated by the motor 23, the upper stage forklift 7 moves in the space 10 from the upper stage to the lower stage, keeping a stable position depending on the engagement between the wheels 18, 19 and the guide groove 20 of the column 3.

The middle stage forklift 8 has the same construction as the upper stage forklift 7, excluding the size thereof, but the details are not described here. Note that X is appended to the end of numerals for the same components as those in the upper stage forklift 7.

The middle stage forklift 8 is mounted on the middle stage transfer frame 25 in a manner allowing free movement thereof in the vertical direction. The middle stage transfer frame 25 has a size allowing it to be stored in one space 10, and also has a pair of frames 28 having a reverse L-shaped form of side face formed by a vertical column 26 and a lateral column 27 respectively. The vertical column 26 has a length equivalent to two stages. In the vertical column 26, a guide groove 29 for the upper wheel 18X and the lower wheel 19X to engage with is formed (FIG. 6).

Upper ends of the pair of wires 21X with the lower ends thereof connected to the upper connecting bar 14X are wound around a drum 30 mounted on the middle stage transfer frame 25. The drum 30 is connected to a motor 31 with a chain 32, and when the drum 30 is rotated by the motor 31, the middle stage forklift 8 moves up and down between the middle stage and the lower stage along the guide groove 29 with which the wheels 18X and 19X are engaged.

A wheel 35, which is rotated via the chain 34 by the motor 33, is attached to the lower edge of the vertical column 26. The wheel 35 moves rotating on the rail 36 extending in the lateral direction within four spaces 10 arranged in series in the lateral direction. For this reason, when the wheel 35 is rotated by the motor 33, the middle stage transfer frame 25 moves in the lateral direction together with the middle stage forklift 8.

Each end of lateral columns 27 of the middle stage transfer frame 25 is connected with each other by a front member 37, and 2 pieces of wheels 38 are attached to the front member 37. The wheels 38 are engaged with a guide rail 39 extending in the lateral direction laterally arranged at a position equivalent to a ceiling of the second floor of the vertical column 3. 40 is a rear member connecting each rear end of the lateral columns 27, and 41 is a lower member connecting each lower end of the vertical columns 26.

The forklift 9 has the same construction as the upper stage forklift 7, excluding the size thereof, so that description of the details is omitted here. Note that Y is appended to the end of numerals for components as those in the upper stage forklift 7.

The lower stage forklift 9 is mounted on the lower stage transfer frame 42 in a manner allowing movement thereof in the vertical direction. Note that Z is appended to numerals for the same components as those in the middle stage transfer frame 25.

A wheel 35Z of the lower stage transfer frame 42 moves rotating on a rail 43 arranged in parallel to the rail 36. A pair of wheels 38Z of the lower stage transfer frame 42 is engaged with a lateral guide rail 44 arranged at a position equivalent to a ceiling on the first floor of the vertical column 3.

Thus, a pair of rails 45 extending in the cross direction is arranged in each longitudinal row respectively. The rails 45 extend from the entrance section 6 to the utmost depth. A truck 46 is arranged on each pair of rails 45 respectively. The truck 46 moves forward and backward by rotating its wheels 47 with the motor 48.

The lateral width of the truck 46 must be narrower than a lateral clearance between the pair of forks 13; 13X and 13Y so that the truck 46 can go into the clearance between the pair of forks.

OPERATION

Description is made for an operation to dock a cargo onto the second upper stage forklift 7 (marked with the sign A) from the right-hand side with reference to FIG. 4. In this case, there is not the lower stage forklift 9 under the upper stage forklift A, but there is the middle stage forklift 8 thereunder, so that the upper stage forklift 7 can not be lowered to the lower stage.

Figure 5:
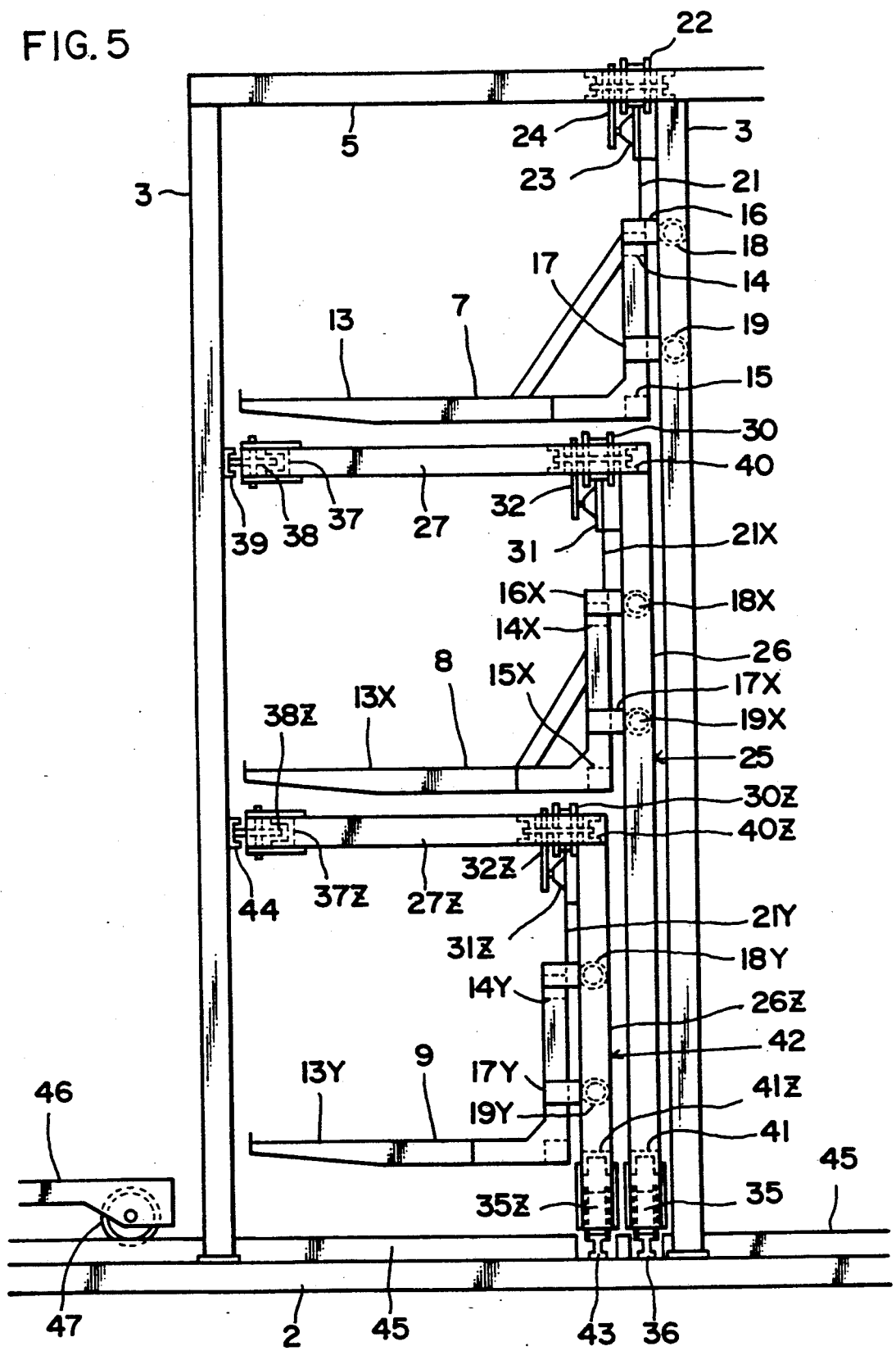
FIG. 5 is an enlarged side view.

Therefor, the wheels 35 are rotated by the motor 33 of the middle stage transfer frame 25 for the middle forklift 8 located under the upper stage forklift A to transfer the middle stage transfer frame 25 sideways into the middle stage transfer space 11. As the forklift 8 is large enough to stride over the lower stage forklift 9 as shown in FIG. 5, the movement of the middle stage forklift 8 is not interfered by the lower stage forklift 9.

When the middle stage forklift 8 is moved sideways and a space is formed under the upper stage forklift A, the drum 22 is rotated by the motor 23 to extend the wire 21, so that the upper stage forklift A is lowered to the lower stage. Then, as the wheels 18 and 19 go down through the guide groove 20, the upper stage forklift A goes down keeping its stable position.

Figure 7:
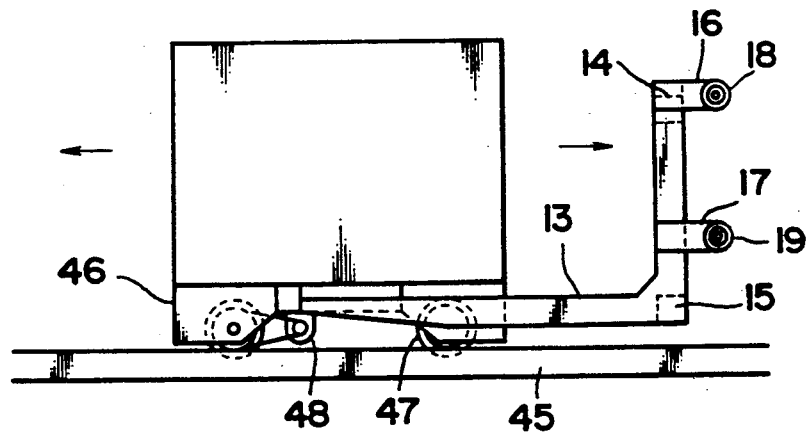
FIG. 7 is a side view of a truck and a lift.
Figure 8:
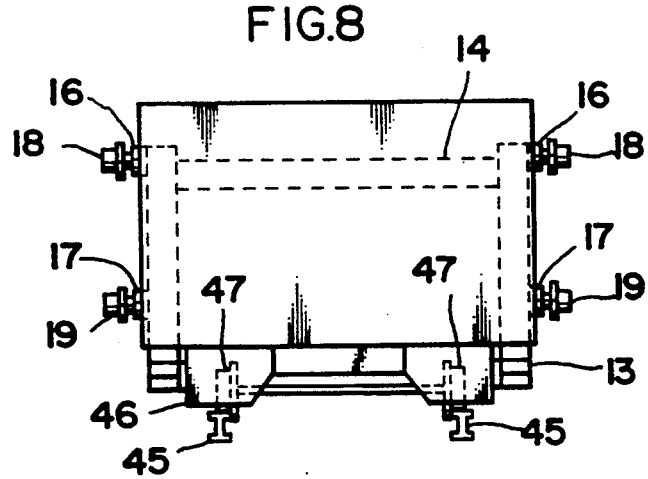
FIG. 8 is a front view of the same.

On the other hand, a cargo to be docked onto the upper stage forklift A is put on a truck 46 on the rail 45 corresponding to the upper stage forklift A, and when the upper stage forklift A goes down to the lower stage, a wheel 47 is rotated by the motor 48 to move the truck 46 toward the upper stage forklift A. Then, as the lateral width of the truck 46 is narrower than a clearance between the pair of forks 13 of the upper stage forklift A, the truck 46 goes into the clearance between the forks 13 as shown in FIG. 7 and FIG. 8.

When the truck 46 completely goes into the clearance between the forks 13, the wire 21 is wound up by rotating the motor 23 of the upper stage forklift A in the reverse direction to make the upper stage forklift A upward. Then, the cargo is raised by the forks 13 and docked onto the upper stage.

Operations to take out a cargo are almost the same as those described above, but in this case, the truck 46 is positioned under the upper stage forklift A first, and then the upper stage forklift A is lowered.

Basic operations of the docking device are as described above, and a cargo can easily be docked onto any lift by forming a path for the truck 46 and each lift by transferring multiple units of the middle stage forklift 8 (middle stage transfer frame 25) as well as multiple units of lower stage forklift 9 (lower stage transfer frame 42).

What is claimed is:

1. A cargo docking device having a frame body having at least two lateral rows, at least two longitudinal rows, at least two stages in height, and multiple entrance sections located along a full lateral length of a front side of said frame body, said device comprising:
   self-propelled trucks for transporting cargo arranged at each of said entrance sections;
   tracks extending from each said entrance into each longitudinal row of said at least two longitudinal rows, on a lowest stage of said at lest two stages of said frame body;
   said trucks being movable on said tracks into each longitudinal row;
   a transfer frame arranged in said frame body and movable parallel to said at least two lateral rows;
   a first forklift movably engaged to said frame body; first cable means for moving said first forklift up and down in a vertical direction;
   said first forklift having a right fork and a left fork spaced apart to allow a truck of said self-propelled trucks to move therebetween on said tracks;
   said first forklift located above said transfer frame in an upper stage of said two stages of said frame body when storing cargo;
   a second forklift having a right fork and a left fork spaced apart to allow a truck of said self-propelled trucks to move therebetween on said tracks;
   said second forklift movably engaged to said transfer frame; second cable means for moving said second forklift up and down in a vertical direction;
   upper lateral rows and upper longitudinal rows of said at least two lateral rows and said at least two longitudinal rows located in said upper stage of said at least two stages of said frame body having first multiple spaces formed and defined by said frame body;
   an identical said first forklift provided within each of said first multiple spaces;
   lower lateral rows and lower longitudinal rows of said at least two lateral rows and said at least two longitudinal rows below said upper stage having second multiple spaces formed and defined by said frame body and having guide rails for moving said transfer frame;
   an identical said transfer frame and said second forklift provided within all said second multiple spaces other than one space in each of said lower lateral rows to permit movement of each said transfer frame on said guide rails;
   a lateral width of each of said trucks being narrower than a clearance between said right fork and said left fork of each of said first forklift and said second forklift;
   wherein each truck of said trucks is movable on said tracks between said right fork and said left fork of each of said first forklift and said second forklift to transfer cargo between said trucks and said right and left forks of said first and second forklifts.

* * * * *